United States Patent
Eichacker et al.

(10) Patent No.: US 12,481,544 B2
(45) Date of Patent: Nov. 25, 2025

(54) SYSTEMS AND METHODS FOR PREDICTING AND MITIGATING OUT OF MEMORY KILLS

(71) Applicant: Netflix, Inc., Los Gatos, CA (US)

(72) Inventors: Andrew David Eichacker, Overland Park, KS (US); Anselm Lau, San Francisco, CA (US); Aryan Mehra, Los Gatos, CA (US); Jason Nicholas Munning, Oakland, CA (US); Farnaz Karimdady Sharifabad, Fremont, CA (US); Prasanna Vijayanathan, Sunnyvale, CA (US); Chaïna Wade, Santa Cruz, CA (US)

(73) Assignee: Netflix, Inc., Los Gatos, CA (US)

(*) Notice: Subject to any disclaimer, the term of this patent is extended or adjusted under 35 U.S.C. 154(b) by 125 days.

(21) Appl. No.: 18/354,582

(22) Filed: Jul. 18, 2023

(65) Prior Publication Data
US 2024/0028432 A1    Jan. 25, 2024

Related U.S. Application Data

(60) Provisional application No. 63/368,873, filed on Jul. 19, 2022.

(51) Int. Cl.
*G06F 11/00* (2006.01)
*G06F 9/50* (2006.01)

(52) U.S. Cl.
CPC ......... *G06F 11/008* (2013.01); *G06F 9/5016* (2013.01)

(58) Field of Classification Search
CPC .... G06F 11/008; G06F 9/5016; G06F 9/5044; G06F 9/505; G06F 12/1009; G06F 9/5005
See application file for complete search history.

(56) References Cited

U.S. PATENT DOCUMENTS

2015/0067238 A1* 3/2015 Marcu ................ G06F 12/0246
                                                                711/103
2017/0351546 A1* 12/2017 Habak .................... G06F 9/505
(Continued)

FOREIGN PATENT DOCUMENTS

EP            2538327 A1    12/2012

OTHER PUBLICATIONS

Yoshida, S, Hatano, K, Takimoto, E, and Takeda, M. Adaptive Online Prediction Using Weighted Windows. IEICE Transactions on Information and Systems, vol. E94-D, No. 10, Oct. 2011. Retrieved from the Internet: <URL:https://www.jstage.jst.go.jp/article/transinf/E94.D/10/E94.D_10_1917/_pdf> (Year: 2011).*

(Continued)

*Primary Examiner* — Michael Maskulinski
*Assistant Examiner* — Bryan P Huang
(74) *Attorney, Agent, or Firm* — Greenberg Traurig, LLP

(57) ABSTRACT

A computer-implemented method includes identifying static information associated with a computing device that is running a media playback application. The method also includes monitoring the media playback application during a playback session to identify dynamic information associated with the playback session. Still further, the method includes instantiating a trained machine learning (ML) model to determine, based on historical usage data associated with the media playback application, a likelihood that the media playback application will experience an out of memory kill. The trained ML model implements a graded window to indicate a scaled likelihood that an out of memory kill will occur within a specified timeframe. Then, according to the trained ML model's determination, the method generates a prediction that an out of memory kill will occur for the media playback application within the (Continued)

specified timeframe. Various other methods, systems, and computer-readable media are also disclosed.

19 Claims, 9 Drawing Sheets

(56) References Cited

U.S. PATENT DOCUMENTS

2021/0208906 A1* 7/2021 Hands ................ G06F 9/485
2021/0264298 A1* 8/2021 Elyasi ................ G06N 20/00

OTHER PUBLICATIONS

International Search Report and Written Opinion received for International application PCT/US2023/070523 mailed on Oct. 26, 2023.
International Preliminary Report on Patentability for International Application No. PCT/US2023/070523, mailed Jan. 30, 2025; 10 pages.

\* cited by examiner

SYSTEMS AND METHODS FOR PREDICTING AND MITIGATING OUT OF MEMORY KILLS

CROSS REFERENCE TO RELATED APPLICATION

This application claims priority to and the benefit of U.S. Provisional Application No. 63/368,873, filed Jul. 19, 2022, entitled "Systems and Methods for Predicting and Mitigating Out of Memory Kills," the disclosure of which is incorporated, in its entirety, by this reference.

BACKGROUND

For many years, media content was distributed via physical copies, including VHS tapes, CDs, DVDs, or other physical media. More recently, however, physical media has been eschewed in favor of streaming media. In the context of streaming media, users typically pay subscription fees to media platforms who, in return, provide an array of media content that can be streamed to different playback devices owned by the user. These playback devices may include smartphones, televisions, computers, laptops, tablets, or other computing devices capable of media playback. Each of these playback devices is configured to run media streaming applications. These media streaming applications act as clients to the servers that provide the media files. The media streaming applications authenticate the user, allow the user to browse available media items, and present or play back selected media items.

These media streaming applications, however, are often subject to memory constraints imposed by the playback devices. In some cases, for instance, media streaming applications can experience "out of memory kills," where low resource availability in the playback device results in an application crash in which the media streaming device is "killed" due to a lack of available memory. Some playback devices may specify a memory amount that, if exceeded, will cause a running application to crash. These hard limits, however, are rarely publicized, making it difficult for media providers to know when their media playback application will crash due to a lack of device memory.

SUMMARY

As will be described in greater detail below, the present disclosure generally describes systems and methods for predicting and mitigating out of memory kills. Accurately and predicting such out of memory kills before they occur allows media streaming applications to run in a more stable fashion and experience fewer crashes.

In one example, a computer-implemented method for predicting out of memory kills includes identifying static information associated with a computing device that is running a media playback application. The method also includes monitoring the media playback application during a playback session to identify dynamic information associated with the playback session. Still further, the method includes instantiating a trained machine learning (ML) model to determine, based on historical usage data associated with the media playback application, a likelihood that the media playback application will experience an out of memory kill. The trained machine learning model implements a graded window to indicate a scaled likelihood that an out of memory kill will occur within a specified timeframe. And, according to the trained ML model's determination, the method includes generating a prediction that an out of memory kill will occur for the media playback application within the specified timeframe.

In some embodiments, identifying static information associated with the computing device includes determining computing device characteristics or computing device capabilities. In some cases, the computing device characteristics include total system memory, device type identifier, software development kit (SDK) version, streaming buffer size, surface cache capacity, playback resolution, support for flexible streaming buffer, support for flexible graphics memory, user interface height, surface size, chipset manufacturer, or computing device brand name. In some examples, the dynamic information associated with the playback session includes current computing device memory usage, navigational level, or foreground or background status.

In some cases, the method further includes adjusting memory usage associated with the playback session of the media playback application. In some examples, adjusting memory usage associated with the playback session of the media playback application includes emptying media data stored in a memory buffer associated with the playback session. In some embodiments, adjusting memory usage associated with the playback session of the media playback application is performed at different threshold amounts of time prior to the predicted out of memory kill.

In some examples, the static information and the dynamic information are combined and implemented to train the ML model. In some cases, the graded window used to indicate a scaled likelihood that an out of memory kill will occur within a specified timeframe includes multiple time threshold values that are temporally separated from the predicted specified timeframe.

In some embodiments, the trained ML model is trained in a supervised manner using labelled input data. In some cases, the specified timeframe is specific to the media playback application. In some cases, the specified timeframe is specific to the computing device.

Still further, a corresponding system includes at least one physical processor and physical memory that includes computer-executable instructions that, when executed by the physical processor, cause the physical processor to: identify static information associated with a computing device that is running a media playback application, monitor the media playback application during a playback session to identify dynamic information associated with the playback session, and instantiate a trained machine learning (ML) model to determine, based on historical usage data associated with the media playback application, a likelihood that the media playback application will experience an out of memory kill. The trained machine learning model implements a graded window to indicate a scaled likelihood that an out of memory kill will occur within a specified timeframe. And, according to the trained ML model's determination, the physical processor generates a prediction that an out of memory kill will occur for the media playback application within the specified timeframe.

In some examples, the physical processor is further configured to train the ML model to predict out of memory kills within specified timeframes using the historical usage data. In some cases, dynamic information associated with the playback session prior to an out of memory kill is labeled in the historical data according to the graded window. In some examples, the dynamic information associated with the playback session that is closer in time to the out of memory kill is assigned a different value than dynamic information associated with the playback session that is further in time from the out of memory kill. In some embodiments, the physical processor is further configured to adjust memory usage associated with the playback session of the media playback application.

In some cases, adjusting memory usage associated with the playback session of the media playback application includes at least partially reducing media data stored in a memory buffer associated with the playback session. In some embodiments, adjusting memory usage associated with the playback session of the media playback application comprises emptying media data stored in a memory buffer associated with the playback session.

In some examples, the above-described method is encoded as computer-readable instructions on a computer-readable medium. For example, in some cases, a computer-readable medium includes computer-executable instructions that, when executed by a processor of a computing device, cause the computing device to: identify static information associated with a computing device that is running a media playback application, monitor the media playback application during a playback session to identify dynamic information associated with the playback session, and instantiate a trained machine learning (ML) model to determine, based on historical usage data associated with the media playback application, a likelihood that the media playback application will experience an out of memory kill. The trained machine learning model implements a graded window to indicate a scaled likelihood that an out of memory kill will occur within a specified timeframe. And, according to the trained ML model's determination, the physical processor generates a prediction that an out of memory kill will occur for the media playback application within the specified timeframe.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
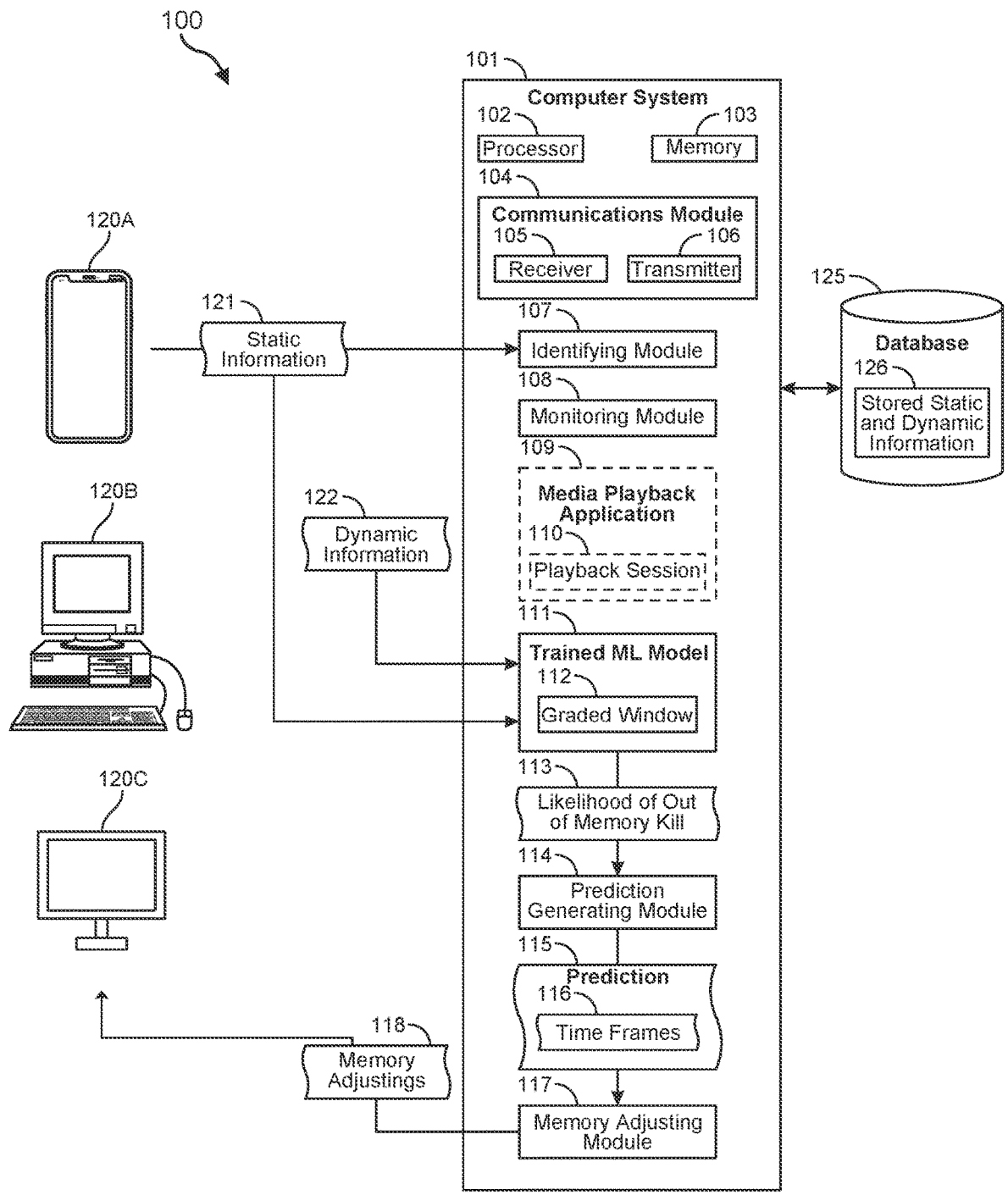
FIG. 1 illustrates an example computer architecture in which the embodiments described herein may operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to predicting and mitigating out of memory kills. As noted above, media playback devices, including smartphones, televisions, tablets, etc. often have limited amounts of memory. This memory may be used by multiple different applications, including the device's operating system. As such, if a given application uses too much memory, that application may crash (or may cause other applications to crash). Such crashes are referred to herein as "out of memory kills" or application terminations that occur due to the playback device being out of memory. In some cases, out of memory kills occur when the media playback application hits a static threshold amount of memory usage (e.g., 200 MB, 300 MB, or some other amount). In such cases, once the streaming application (or other application) hits that threshold of, for example, 200 MB of memory usage, that application will be "killed" or terminated. These unexpected application crashes lead to a poor user experience, as the user will have to wait for the streaming application to reload on their device.

Still further, these threshold amounts of memory usage are not typically known. Indeed, most device manufacturers do not make these static limits (if such exist) public. The static limits are typically held in confidence by the company and may vary with each model of a manufacturer's devices. Accordingly, generalized rules establishing global static memory usage values within which all instances of the streaming application are to run are untenable. Streaming applications would need to know, for each specific device, what the static threshold value for that device was and then stay below that value when operating that application. Because such information is typically not available, such a solution cannot be broadly carried out.

In contrast, the systems described herein use historical information to train a machine learning (ML) model to predict when out of memory kills are most likely to occur. And, at least in some cases, these systems then take actions to prevent the predicted out of memory kills from happening before they occur. As part of this prediction process, the systems herein gather static information related to each playback device, including total system memory, device type identifier, software development kit (SDK) version, streaming buffer size, playback resolution, and/or other types of information that are unlikely to change within a given media streaming session. Furthermore, the systems herein gather dynamic information related to media streaming sessions, including current memory usage, navigational level, foreground or background status, or other dynamic information that may change during a given streaming session. The static and dynamic information is then combined together and used to predict whether an out of memory kill is likely to happen within a specified timeframe (e.g., within the next two minutes, one minute, 30 seconds, etc.). This prediction process, along with the process of training the ML model to perform the predictions, will be described in greater detail below with reference to FIGS. 1-9.

FIG. 1, for example, illustrates a computing environment 100 in which out of memory kills are predicted and mitigated. FIG. 1 includes various electronic components and elements including a computer system 101 that is used, alone or in combination with other computer systems, to perform associated tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes an identifying module 107. The identifying module 107 is configured to identify static information 121 related to various media playback devices. As the term is used herein, a "media playback device" or simply "playback device" refers to a computing device capable of playing back or presenting media items including videos, songs, pictures, documents, or other media items in a digital or analog display. Some examples of playback devices may include smartphones (e.g., 120A), laptops, tablets, personal computers (e.g., 120B), smart televisions (e.g., 120C), gaming consoles, streaming sticks, or other similar computing devices. The static information 121 may include computing device characteristics include total system memory, device type identifier, software development kit (SDK) version, streaming buffer size, surface cache capacity, playback resolution, support for flexible streaming buffer, support for flexible graphics memory, user interface height, surface size, chipset manufacturer, computing device brand name, or other information that either cannot change or is unlikely to change during the course of a media playback session.

The monitoring module 108 of computer system 101 is configured to monitor one or more streaming sessions 110 instantiated between the computer system 101 and a media playback device (e.g., 120A). As noted above, each media playback device will run a media playback application 109 or "client application." This client application will provide user interfaces that allow users to browse and select media items as well as facilitate communication between the playback device and the server(s) that store(s) the media files. The client application may also be configured to decode, decrypt, and/or perform other processing on the streamed data. During this streaming process, the monitoring module 108 gathers dynamic information 122 about the streaming session 110 including, for example, current computing device memory usage, navigational level, application foreground or background status, or other information that is likely to change during the course of the streaming session. The dynamic and static information 126 is stored in database 125 or in other local or remote data stores.

A trained machine learning (ML) model 111 then combines the static information 121 with the dynamic information 122 (e.g., using a Join operation) and determines, for each device and each streaming session, how close the device is to issuing an out of memory kill which would terminate the media playback application 109. In some cases, the ML model 112 uses a graded window to determine which dynamic and static information is most important when predicting an out of memory kill. For example, if historical application data is analyzed that indicates logged information at five minutes before an out of memory (OOM) kill, at three minutes before the OOM kill, at one minute before the OOM kill, and 30 seconds before the OOM kill, the information gathered at one minute or 30 seconds before the OOM kill may be a better indicator of the application's operating state immediately prior to the OOM kill and may be a better indicator of which types of application behavior could be avoided or changed to reduce the likelihood of experiencing an OOM kill. In such cases, log information may be given priority or additional weighting along a graded window of importance.

Once the ML model 111 provides a likelihood of experiencing an OOM kill 113, the prediction generating module 114 of computer system 101 will generate a prediction 115 that an OOM kill will occur within a specified timeframe 116 (e.g., within the next one minute or within the next 30 seconds). The memory adjusting module 117 then sends memory adjustment instructions 118 to the media playback device to reduce its memory buffer, to eliminate all of the data in its memory buffer, or to take another remedial action. This process will be described in greater detail with respect to method 200 of FIG. 2 and FIGS. 1-9 below.

Figure 2:
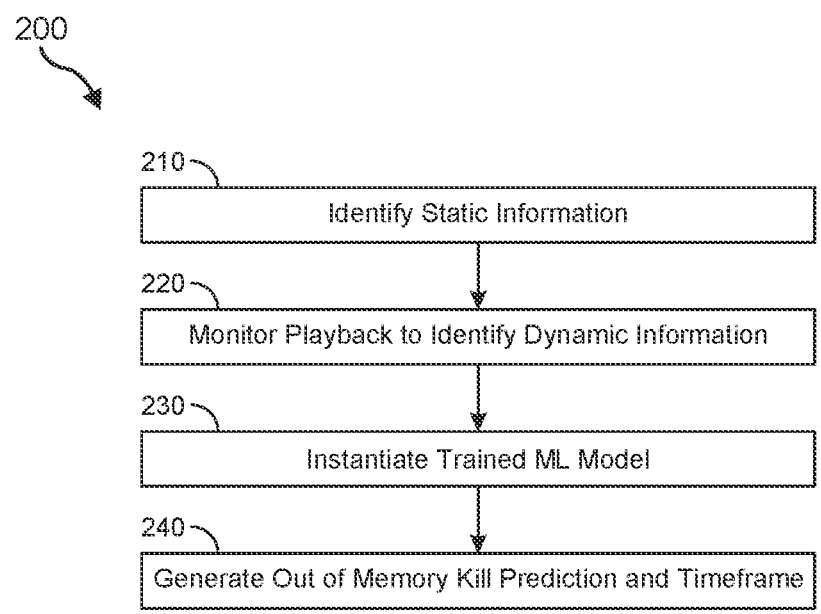
FIG. 2 illustrates a flow diagram of an exemplary method for predicting and mitigating out of memory kills.

FIG. 2 is a flow diagram of an exemplary computer-implemented method 200 for predicting and mitigating out of memory kills. The steps shown in FIG. 2 may be performed by any suitable computer-executable code and/or computing system, including the systems illustrated in FIG. 1. In one example, each of the steps shown in FIG. 2 may represent an algorithm whose structure includes and/or is represented by multiple sub-steps, examples of which will be provided in greater detail below.

Method 200 includes, at 210, a step for identifying static information associated with a computing device that is running a media playback application. At step 220, method 200 includes monitoring the media playback application during a playback session to identify dynamic information associated with the playback session. At step 230, method 200 includes instantiating a trained machine learning (ML) model to determine, based on historical usage data associated with the media playback application, a likelihood that the media playback application will experience an out of memory kill. The trained machine learning model implements a graded window to indicate a scaled likelihood that an out of memory kill will occur within a specified timeframe. At step 240, according to the trained ML model's determination, method 200 includes generating a prediction that an out of memory kill will occur for the media playback application within the specified timeframe.

Optionally, memory usage associated with the playback session of the media playback application on the playback device is adjusted. These adjustments can include reducing or emptying media data stored in a memory buffer associated with the playback session. In some cases, the adjusting is performed at different threshold amounts of time prior to the predicted out of memory kill.

Figure 3:
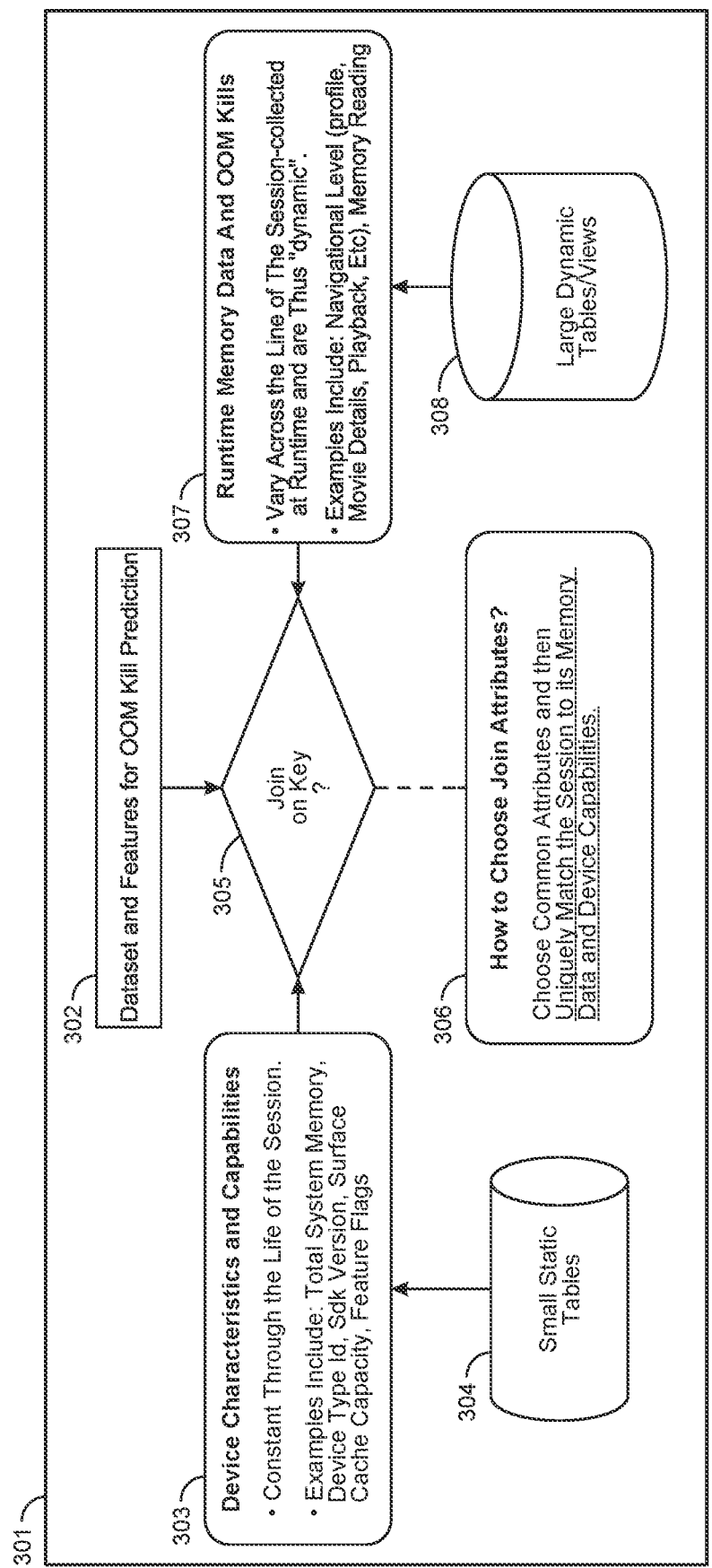
FIG. 3 illustrates datasets and computing features for predicting and mitigating out of memory kills.

FIG. 3 illustrates an example embodiment 301 of datasets and features 302 that may be used for OOM kill predictions. For example, static information, including device characteristics and capabilities 303 are typically constant throughout the life of a given streaming session. Most streaming sessions last a few hours or less and, as such, device characteristics and capabilities are unlikely (or unable) to change within that timeframe. Such playback device characteristics and capabilities include total system memory, device type identifier, SDK version, surface cache capacity, flags that identify various features that are available on that playback device, or other similar characteristics.

These are joined (at 305) with dynamic information including runtime memory data and OOM kill information 307. This information varies across the life of the streaming session and is collected at runtime (e.g., by monitoring module 108 of FIG. 1). In this manner, the information is said to be dynamic. Examples of such information include the current navigational level (e.g., is the user looking at their profile information, looking at movie or television show details, is the client application currently playing back a video, etc.), how much memory is the client application currently using (e.g., 100 MB, 200 MB, 300 MB, 500 MB, 1 GB, etc.), whether the client application is in the foreground or background (e.g., for playback of audio songs), or other information that can be determined during runtime. At least in some cases, the static information is stored in relatively small static tables 304, while the dynamic information is stored in relatively larger dynamic tables or views 308.

The static and dynamic information is joined at 305 by matching a session to its memory data and device capabilities (306). Thus, for instance, if user A is watching a movie on a television of Brand A that is running SDK A having a device type ID of A and presenting at resolution A may experience certain memory usage over time and may experience an OOM kill. This memory usage data and static information are matched and stored together for ML model training. Similarly, if user B is watching a television show on a smartphone of Brand B that is running SDK B having a device type ID of B and presenting at resolution B may experience certain memory usage over time and may also experience an OOM kill. This memory usage data and static information are matched and stored together for ML model training. The static information provides hardware, firmware, and software parameters in which the streaming session is operating. ML models can then use this data, in combination with data from multiple other streaming sessions, to identify patterns indicating when an OOM kill is likely to occur. This information is then used to make OOM predictions and take remedial actions before those OOM kills occur.

In some cases, remedial actions include adjusting memory usage associated with a playback session of the media playback application. Each time a streaming session is instantiated, that streaming session will use memory on the playback device (in addition to central processing unit (CPU) resources, network bandwidth, data storage, and other system resources. The streaming session may begin using a certain amount of random-access memory (RAM) or data storage to allow login and browsing and may use a different amount when streaming data. In some embodiments, a buffer of data is established so that, for example, if network connection issues interrupt the data stream, buffer data can be used to continue playback during the interruption.

Depending on the resolution, network speed, and other factors, the amount of data stored in the buffer can vary greatly. Moreover, some playback devices such as computers may have relatively large amounts of RAM and other data storage, while televisions or streaming sticks have relatively smaller amounts. As such, the remedial actions taken to adjust memory usage vary with and are specific to each playback device, depending on its playback capabilities and/or device characteristics. In some examples, adjusting memory usage associated with the playback session of the media playback application includes emptying media data stored in the playback device's memory buffer (which may be in RAM, in data storage (e.g., hard drives), or in both). In other cases, adjusting memory usage associated with the playback session of the media playback application includes reducing memory usage (e.g., by 10% or by 20% or by 50% or by X number of MB) in the playback application. In some embodiments, adjusting the memory usage is performed at different threshold amounts of time prior to the predicted out of memory kill.

Figure 4:
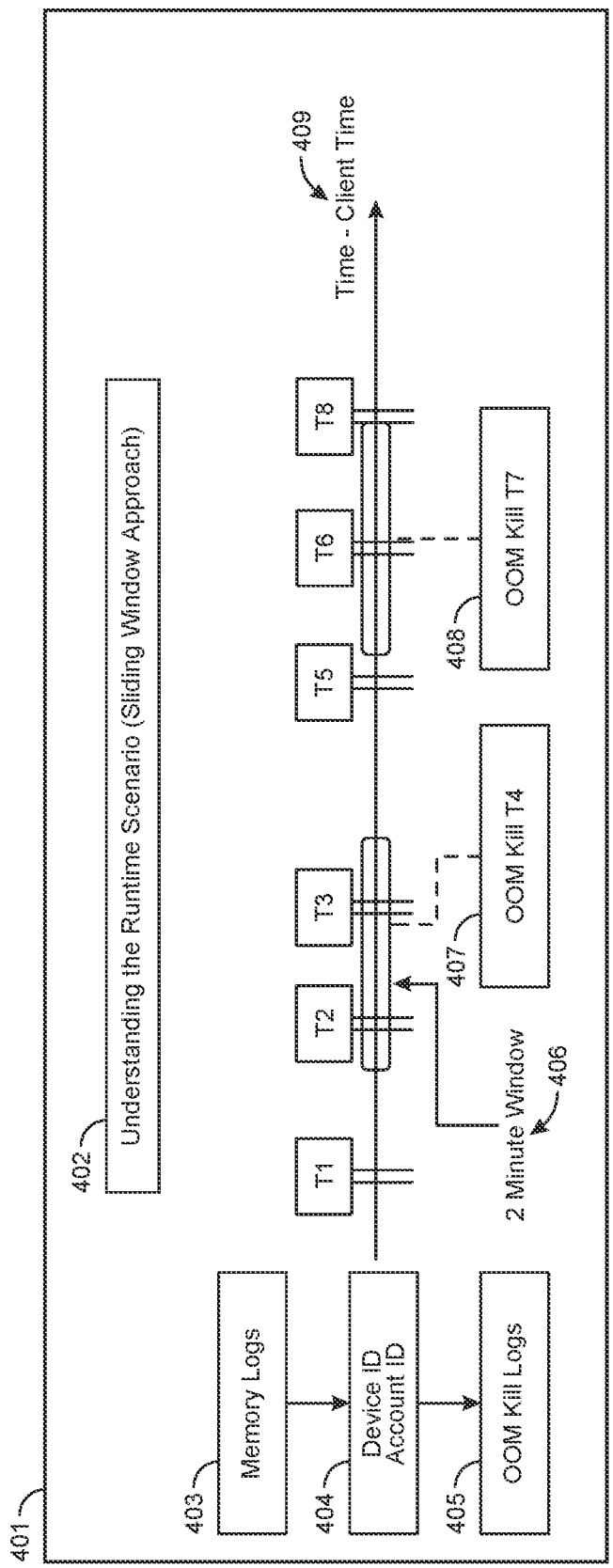
FIG. 4 illustrates an embodiment in which a sliding window is used to generate out of memory kill predictions.

For instance, as shown in embodiment 401 of FIG. 4, OOM kills may occur at time T4 (407) and time T7 (408). The times preceding or leading up to those OOM kills are noted as T1-T3 and T5-T6, respectively, on timeline 409. T2 and T3 are closer in time to the OOM kill at T4 than T1 is. Thus, the runtime and static data accessed in memory logs 403 and OOM kill logs 405 (including device ID, account ID, etc. 404) that is close to the OOM kill is more pertinent or more important to determining what caused an OOM kill. Said in another way, the memory usage at times T2, T3, and T6 give a better indication of problematic memory usage than memory usage at T1, T5, or T8 (after the playback application has been restarted post-OOM kill at T7. Thus, in this sliding window approach 402, the memory usage data, navigational level, foreground or background status, or other dynamic information, when combined with information identifying the playback device and its capabilities, at time T2, T3 or T6 (e.g., times within a specified window 406 (two minutes in this example)) are stronger indications of a pending OOM kill than information gathered further from the OOM kill. In some cases, this closer information (e.g., at T2 & T3) is weighted higher or is otherwise prioritized when generating OOM kill predictions.

Figure 5:
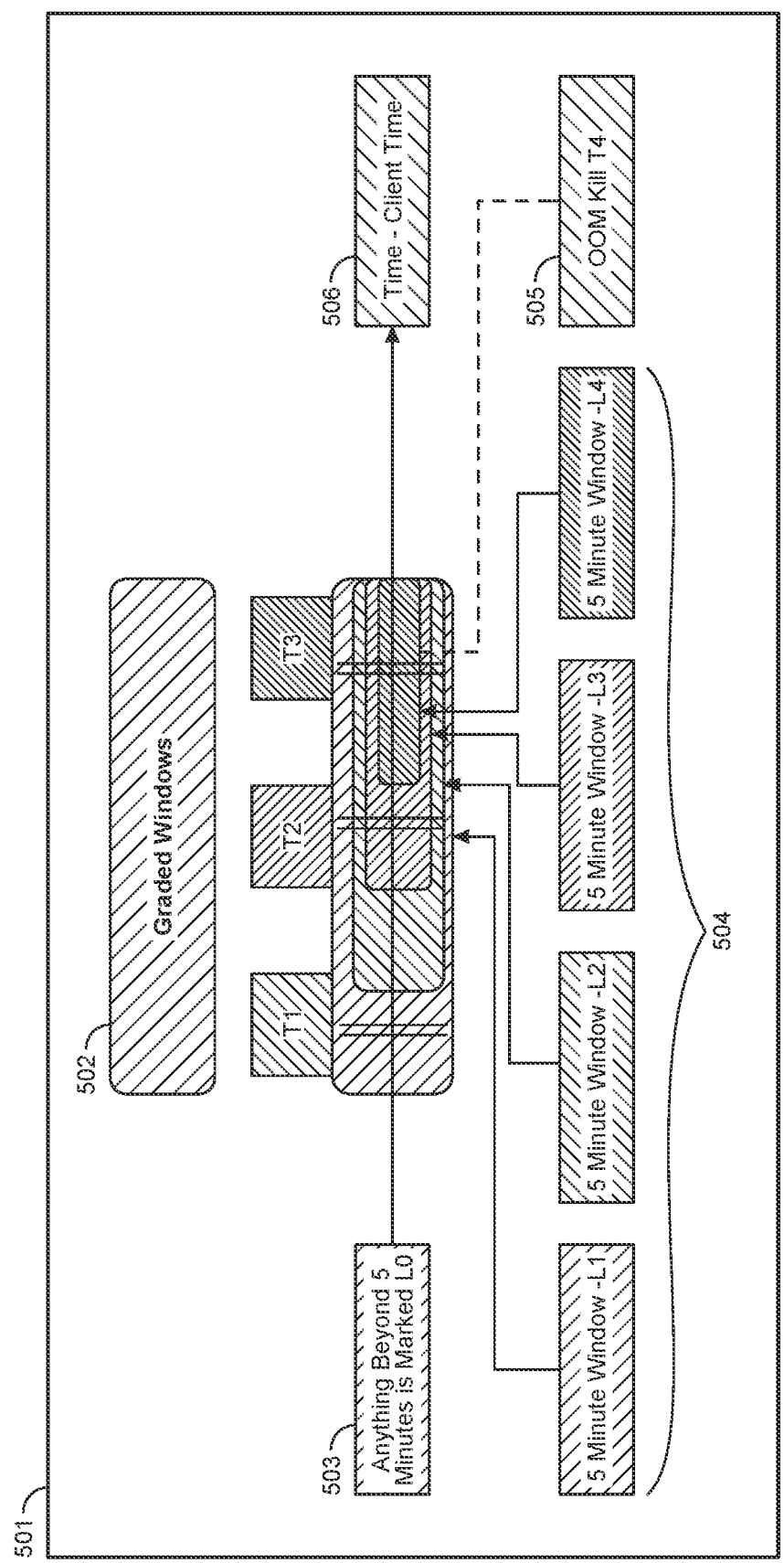
FIG. 5 illustrates an embodiment in which graded windows are used to train a machine learning model to predict out of memory kills.

FIG. 5 illustrates an embodiment 501 in which an ML model may be trained and/or implemented to predict OOM kills. In some cases, static information and dynamic information are combined and implemented to train the ML model. In some cases, a graded window is used to indicate a scaled likelihood that an out of memory kill will occur within a specified timeframe. This graded window includes multiple time threshold values that are temporally separated from the predicted specified timeframe. FIG. 5 illustrates four graded windows 504 (L1-L4) that are each increasingly smaller (i.e., scaled): L1 is a five-minute window, L2 is a four-minute window, L3 is a three-minute window, and L4 is a two-minute window. In this embodiment, anything beyond five minutes is marked L0 (503). It will be recognized that these values were arbitrarily chosen, and that substantially any amount of time may be used in each window and that substantially any number of time windows may be used in this graded windows approach 502.

Within the graded windows 504, current playback application operating conditions may be monitored at different times. For instance, in one example, current conditions are determined at time T1 (in window L1), at time T2 (in window L3), and at time T3 (in window L4), with an OOM kill occurring at time T4 (505) on time scale 506. In some cases, the ML model is trained in a supervised manner using labelled input data. As such, in this graded windows example, the dynamic data gathered at time T1 is labeled as part of time window L1 and may be associated with a lower score or weight due to its temporal distance from the occurrence of the OOM kill at T4 (505). The dynamic data gathered at time T2 is labeled as part of time window L3 and may be associated with a higher score or weight than that of T1 due to its closer temporal distance from the OOM kill at T4. Still further, the dynamic data gathered at time T3 is labeled as part of time window L4 and may be associated with an even higher score or weight than that of T1 data or T2 data due to its still closer temporal distance from the OOM kill. Thus, instead of simply labeling all data prior to an OOM kill as equally valid or equally weighted or of equal importance, dynamic data gathered at different times is given different labels to distinguish its level of importance.

Over many hundreds, thousands, or millions of different OOM kills experienced on different types of devices in different situations, a valuable subset of historical application termination data may be accumulated, analyzed, and labeled according to the graded windows 502 to train the ML model to recognize when an OOM kill is imminent within a device. As such, the ML model provides a prediction of when an OOM kill is expected to occur for that device (e.g., in 10 min, in 1 min., in 30 sec., in 10 sec., etc.). The specified timeframe may be specific to the computing device and/or to the media playback application version. The dynamically gathered data, when organized into different timeframes or time windows that occur before an OOM kill, provide varying levels of importance to the data. Memory usage data gathered or sampled immediately prior to an OOM kill may be much more predictive of future OOM kills than memory usage data that is gathered three minutes, five minutes, 10 minutes, or longer (L0) before an OOM kill. Then, when similar memory usage is occurring in an application (especially on a known device), the ML model can accurately predict that an OOM kill is imminent or is at least very likely. Remedial actions can then be taken to prevent the OOM kill before it occurs.

Thus, in this manner, the systems herein are configured to train ML models to predict out of memory kills within specified timeframes using historical usage data that is labeled according to a graded window having different time windows. The dynamic information associated with the playback session that is closer in time to an out of memory kill is assigned a different (e.g., higher) value than dynamic information associated with the playback session that is further in time from the OOM kill. Once an OOM kill has been predicted and when the timeframe is short enough (e.g., is below a predefined threshold of 10 seconds or 30 seconds or 60 seconds, etc.), one or more remedial actions are taken. These remedial actions include adjusting memory usage associated with the playback session of the media playback application.

The memory adjustments may occur in real time as the application is operating and include reducing or eliminating the amount of memory stored in the device's memory buffer. In some cases, memory usage is reduced by a specific amount and the application is re-evaluated to determine whether an OOM kill is still imminent or whether the threat has subsided. In such implementations, the ML model may be trained to overemphasize or give greater weight to avoiding false negatives, even at the expense of increasing the number of false positives. Clearing a memory buffer and potentially having to wait a moment for it to be refilled may be (much) more tolerable to an end user than having the application crash due to a false negative prediction.

Figure 6:
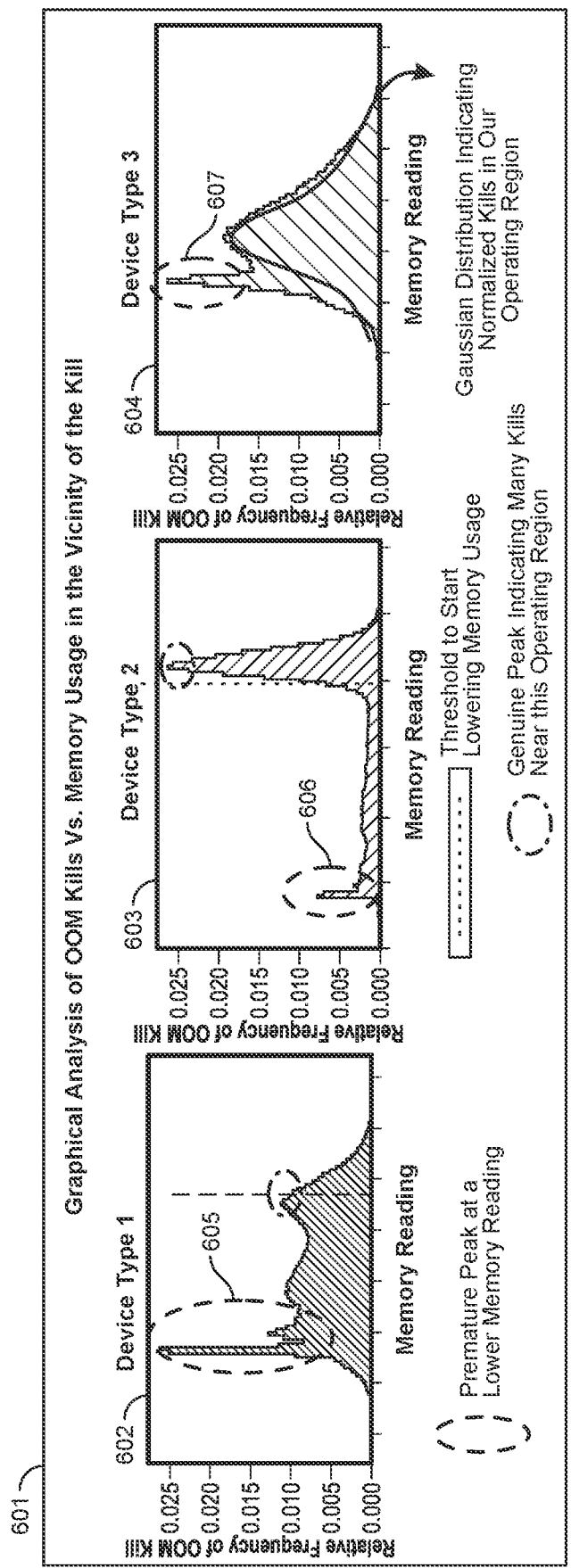
FIG. 6 illustrates a graphical analysis of out of memory kills with respect to memory usage of a media playback application.

FIG. 6 illustrates a chart 601 showing memory usage charts vs. OOM kills for three different device types: device type 1 (602), device type 2 (603), and device type 3 (604). The Y-axes of these charts shows a relative frequency of OOM kills, while the X-axes show an amount of memory used by the playback application. Points 605, 606, and 607 illustrate premature peaks at lower memory reading. Most of these peaks represent non-user visible crashes and can be removed from the analysis. Points occurring at the vertical ellipses indicate genuine peaks indicating higher numbers of OOM kills. As such, the threshold for beginning to lower memory usage at the vertical ellipses overlaps or aligns with the point at which memory usage leads to a higher number of OOM kills. In some cases, the threshold amount of memory usage may be device-specific or may be specific to the client application used on the playback device. Using such historical data, the ML models described herein can identify and predict when an OOM kill is likely to occur and then trigger a remedial response to reduce the number of OOM kills that occur or to prevent the OOM kills entirely.

A system corresponding to the above-described method is also provided herein. The system includes at least one physical processor and physical memory including computer-executable instructions that, when executed by the physical processor, cause the physical processor to: identify static information associated with a computing device that is running a media playback application, monitor the media playback application during a playback session to identify dynamic information associated with the playback session, and instantiate a trained machine learning (ML) model to determine, based on historical usage data associated with the media playback application, a likelihood that the media playback application will experience an out of memory kill. The trained machine learning model implements a graded window to indicate a scaled likelihood that an out of memory kill will occur within a specified timeframe. And, according to the trained ML model's determination, the physical processor generates a prediction that an out of memory kill will occur for the media playback application within the specified timeframe.

A corresponding non-transitory computer-readable medium is also provided. The non-transitory computer-readable medium includes one or more computer-executable instructions that, when executed by at least one processor of a computing device, cause the computing device to: identify static information associated with a computing device that is running a media playback application, monitor the media playback application during a playback session to identify dynamic information associated with the playback session, and instantiate a trained machine learning (ML) model to determine, based on historical usage data associated with the media playback application, a likelihood that the media playback application will experience an out of memory kill. The trained machine learning model implements a graded window to indicate a scaled likelihood that an out of memory kill will occur within a specified timeframe. And, according to the trained ML model's determination, the physical processor generates a prediction that an out of memory kill will occur for the media playback application within the specified timeframe.

Figure 7:
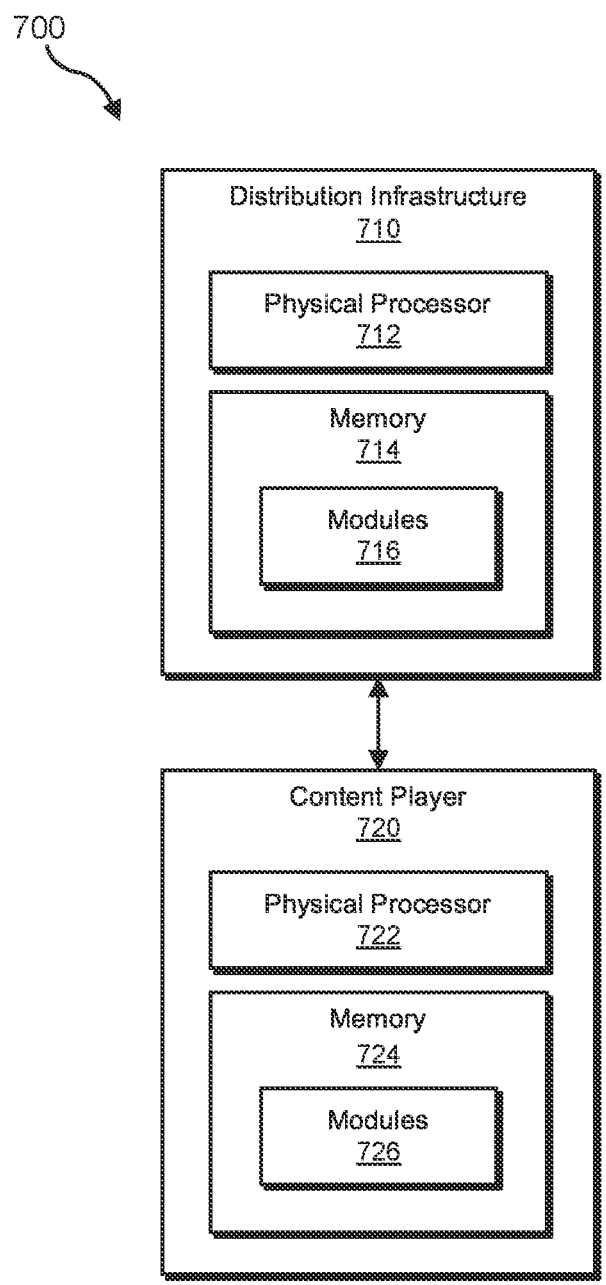
FIG. 7 is a block diagram of an exemplary content distribution ecosystem.
Figure 8:
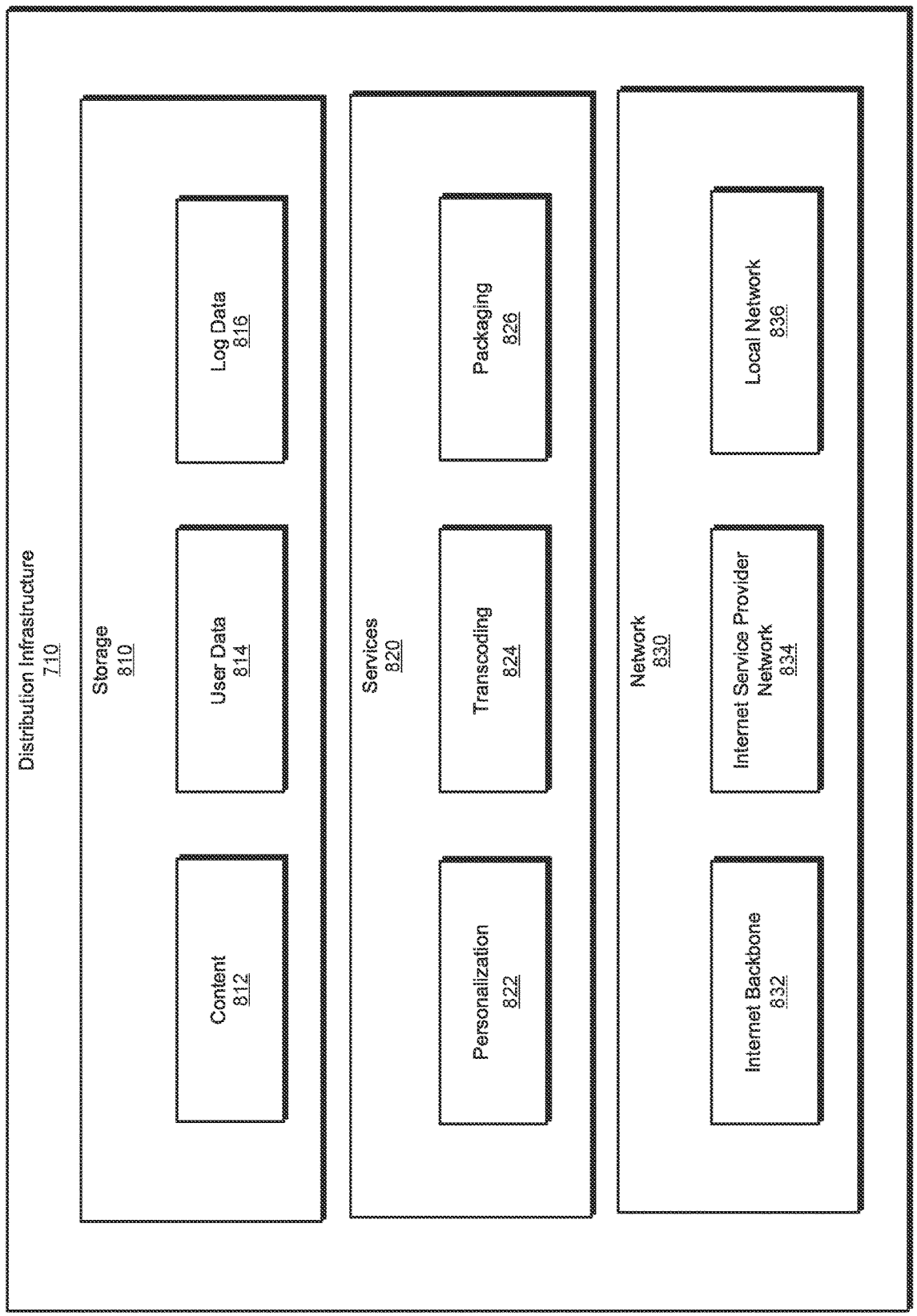
FIG. 8 is a block diagram of an exemplary distribution infrastructure within the content distribution ecosystem shown in FIG. 7.
Figure 9:
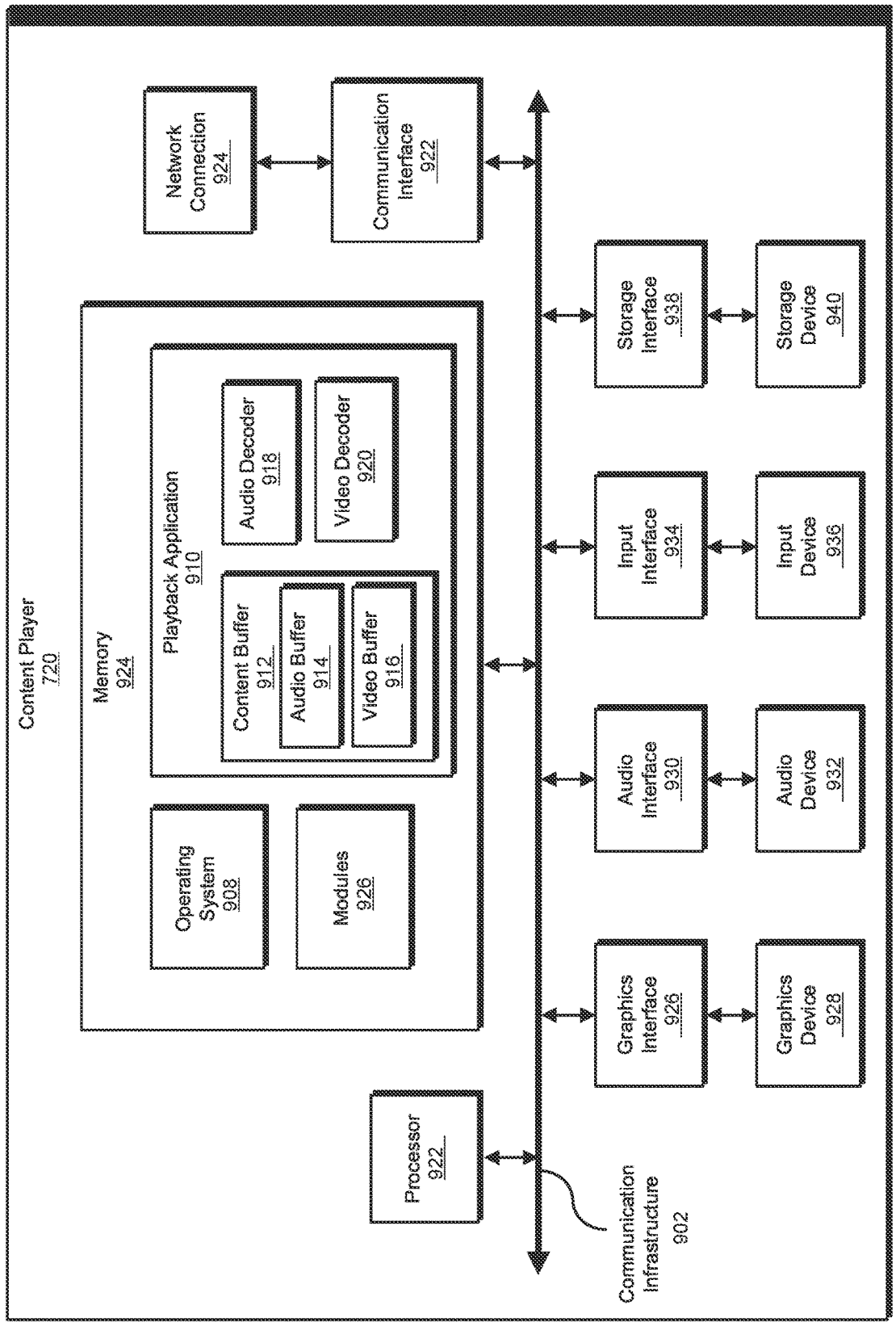
FIG. 9 is a block diagram of an exemplary content player within the content distribution ecosystem shown in FIG. 8.

The following will provide, with reference to FIG. 7, detailed descriptions of exemplary ecosystems in which content is provisioned to end nodes and in which requests for content are steered to specific end nodes. The discussion corresponding to FIGS. 8 and 9 presents an overview of an exemplary distribution infrastructure and an exemplary content player used during playback sessions, respectively. These exemplary ecosystems and distribution infrastructures are implemented in any of the embodiments described above with reference to FIGS. 1-16.

FIG. 7 is a block diagram of a content distribution ecosystem 700 that includes a distribution infrastructure 710 in communication with a content player 720. In some embodiments, distribution infrastructure 710 is configured to encode data at a specific data rate and to transfer the encoded data to content player 720. Content player 720 is configured to receive the encoded data via distribution infrastructure 710 and to decode the data for playback to a user. The data provided by distribution infrastructure 710 includes, for example, audio, video, text, images, animations, interactive content, haptic data, virtual or augmented reality data, location data, gaming data, or any other type of data that is provided via streaming.

Distribution infrastructure 710 generally represents any services, hardware, software, or other infrastructure components configured to deliver content to end users. For example, distribution infrastructure 710 includes content aggregation systems, media transcoding and packaging services, network components, and/or a variety of other types of hardware and software. In some cases, distribution infrastructure 710 is implemented as a highly complex distribution system, a single media server or device, or anything in between. In some examples, regardless of size or complexity, distribution infrastructure 710 includes at least one physical processor 712 and at least one memory device 714. One or more modules 716 are stored or loaded into memory 714 to enable adaptive streaming, as discussed herein.

Content player 720 generally represents any type or form of device or system capable of playing audio and/or video content that has been provided over distribution infrastructure 710. Examples of content player 720 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 710, content player 720 includes a physical processor 722, memory 724, and one or more modules 726. Some or all of the adaptive streaming processes described herein is performed or enabled by modules 726, and in some examples, modules 716 of distribution infrastructure 710 coordinate with modules 726 of content player 720 to provide adaptive streaming of digital content.

In certain embodiments, one or more of modules 716 and/or 726 in FIG. 7 represent one or more software applications or programs that, when executed by a computing device, cause the computing device to perform one or more tasks. For example, and as will be described in greater detail below, one or more of modules 716 and 726 represent modules stored and configured to run on one or more general-purpose computing devices. One or more of modules 716 and 726 in FIG. 7 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 712 and 722 generally represent any type or form of hardware-implemented processing unit capable of interpreting and/or executing computer-readable instructions. In one example, physical processors 712 and 722 access and/or modify one or more of modules 716 and 726, respectively. Additionally or alternatively, physical processors 712 and 722 execute one or more of modules 716 and 726 to facilitate adaptive streaming of digital content. Examples of physical processors 712 and 722 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 714 and 724 generally represent any type or form of volatile or non-volatile storage device or medium capable of storing data and/or computer-readable instructions. In one example, memory 714 and/or 724 stores, loads, and/or maintains one or more of modules 716 and 726. Examples of memory 714 and/or 724 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 8 is a block diagram of exemplary components of content distribution infrastructure 710 according to certain embodiments. Distribution infrastructure 710 includes storage 810, services 820, and a network 830. Storage 810 generally represents any device, set of devices, and/or systems capable of storing content for delivery to end users. Storage 810 includes a central repository with devices capable of storing terabytes or petabytes of data and/or includes distributed storage systems (e.g., appliances that mirror or cache content at Internet interconnect locations to provide faster access to the mirrored content within certain regions). Storage 810 is also configured in any other suitable manner.

As shown, storage 810 may store a variety of different items including content 812, user data 814, and/or log data 816. Content 812 includes television shows, movies, video games, user-generated content, and/or any other suitable type or form of content. User data 814 includes personally identifiable information (PII), payment information, preference settings, language and accessibility settings, and/or any other information associated with a particular user or content player. Log data 816 includes viewing history information, network throughput information, and/or any other metrics associated with a user's connection to or interactions with distribution infrastructure 710.

Services 820 includes personalization services 822, transcoding services 824, and/or packaging services 826. Personalization services 822 personalize recommendations, content streams, and/or other aspects of a user's experience with distribution infrastructure 710. Encoding services 824 compress media at different bitrates which, as described in greater detail below, enable real-time switching between different encodings. Packaging services 826 package encoded video before deploying it to a delivery network, such as network 830, for streaming.

Network 830 generally represents any medium or architecture capable of facilitating communication or data transfer. Network 830 facilitates communication or data transfer using wireless and/or wired connections. Examples of network 830 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 8, network 830 includes an Internet backbone 832, an internet service provider 834, and/or a local network 836. As discussed in greater detail below, bandwidth limitations and bottlenecks within one or more of these network segments triggers video and/or audio bit rate adjustments.

FIG. 9 is a block diagram of an exemplary implementation of content player 720 of FIG. 7. Content player 720 generally represents any type or form of computing device capable of reading computer-executable instructions. Content player 720 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 9, in addition to processor 722 and memory 724, content player 720 includes a communication infrastructure 902 and a communication interface 922 coupled to a network connection 924. Content player 720 also includes a graphics interface 926 coupled to a graphics device 928, an input interface 934 coupled to an input device 936, and a storage interface 938 coupled to a storage device 940.

Communication infrastructure 902 generally represents any type or form of infrastructure capable of facilitating communication between one or more components of a computing device. Examples of communication infrastructure 902 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 724 generally represents any type or form of volatile or non-volatile storage device or medium capable of storing data and/or other computer-readable instructions. In some examples, memory 724 stores and/or loads an operating system 908 for execution by processor 722. In one example, operating system 908 includes and/or represents software that manages computer hardware and software resources and/or provides common services to computer programs and/or applications on content player 720.

Operating system 908 performs various system management functions, such as managing hardware components (e.g., graphics interface 926, audio interface 930, input interface 934, and/or storage interface 938). Operating system 908 also provides process and memory management models for playback application 910. The modules of playback application 910 includes, for example, a content buffer 912, an audio decoder 918, and a video decoder 920.

Playback application 910 is configured to retrieve digital content via communication interface 922 and play the digital content through graphics interface 926. Graphics interface 926 is configured to transmit a rendered video signal to graphics device 928. In normal operation, playback application 910 receives a request from a user to play a specific title or specific content. Playback application 910 then identifies one or more encoded video and audio streams associated with the requested title. After playback application 910 has located the encoded streams associated with the requested title, playback application 910 downloads sequence header indices associated with each encoded stream associated with the requested title from distribution infrastructure 710. A sequence header index associated with encoded content includes information related to the encoded sequence of data included in the encoded content.

In one embodiment, playback application 910 begins downloading the content associated with the requested title by downloading sequence data encoded to the lowest audio and/or video playback bitrates to minimize startup time for playback. The requested digital content file is then downloaded into content buffer 912, which is configured to serve as a first-in, first-out queue. In one embodiment, each unit of downloaded data includes a unit of video data or a unit of audio data. As units of video data associated with the requested digital content file are downloaded to the content player 720, the units of video data are pushed into the content buffer 912. Similarly, as units of audio data associated with the requested digital content file are downloaded to the content player 720, the units of audio data are pushed into the content buffer 912. In one embodiment, the units of video data are stored in video buffer 916 within content buffer 912 and the units of audio data are stored in audio buffer 914 of content buffer 912.

A video decoder 920 reads units of video data from video buffer 916 and outputs the units of video data in a sequence of video frames corresponding in duration to the fixed span of playback time. Reading a unit of video data from video buffer 916 effectively de-queues the unit of video data from video buffer 916. The sequence of video frames is then rendered by graphics interface 926 and transmitted to graphics device 928 to be displayed to a user.

An audio decoder 918 reads units of audio data from audio buffer 914 and outputs the units of audio data as a sequence of audio samples, generally synchronized in time with a sequence of decoded video frames. In one embodiment, the sequence of audio samples is transmitted to audio interface 930, which converts the sequence of audio samples into an electrical audio signal. The electrical audio signal is then transmitted to a speaker of audio device 932, which, in response, generates an acoustic output.

In situations where the bandwidth of distribution infrastructure 710 is limited and/or variable, playback application 910 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 926 is configured to generate frames of video data and transmit the frames of video data to graphics device 928. In one embodiment, graphics interface 926 is included as part of an integrated circuit, along with processor 722. Alternatively, graphics interface 926 is configured as a hardware accelerator that is distinct from (i.e., is not integrated within) a chipset that includes processor 722.

Graphics interface 926 generally represents any type or form of device configured to forward images for display on graphics device 928. For example, graphics device 928 is fabricated using liquid crystal display (LCD) technology, cathode-ray technology, and light-emitting diode (LED) display technology (either organic or inorganic). In some embodiments, graphics device 928 also includes a virtual reality display and/or an augmented reality display. Graphics device 928 includes any technically feasible means for generating an image for display. In other words, graphics device 928 generally represents any type or form of device capable of visually displaying information forwarded by graphics interface 926.

As illustrated in FIG. 9, content player 720 also includes at least one input device 936 coupled to communication infrastructure 902 via input interface 934. Input device 936 generally represents any type or form of computing device capable of providing input, either computer or human generated, to content player 720. Examples of input device 936 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 720 also includes a storage device 940 coupled to communication infrastructure 902 via a storage interface 938. Storage device 940 generally represents any type or form of storage device or medium capable of storing data and/or other computer-readable instructions. For example, storage device 940 is a magnetic disk drive, a solid-state drive, an optical disk drive, a flash drive, or the like. Storage interface 938 generally represents any type or form of interface or device for transferring data between storage device 940 and other components of content player 720.

EXAMPLE EMBODIMENTS

Example 1: A computer-implemented method comprising: identifying one or more portions of static information associated with a computing device that is running a media playback application; monitoring the media playback application during a playback session to identify one or more portions of dynamic information associated with the playback session; instantiating a trained machine learning (ML) model to determine, based on historical usage data associated with the media playback application, a likelihood that the media playback application will experience an out of memory kill, wherein the trained machine learning model implements a graded window to indicate a scaled likelihood that an out of memory kill will occur within a specified timeframe; and according to the trained ML model's determination, generating a prediction that an out of memory kill will occur for the media playback application within the specified timeframe.

Example 2. The computer-implemented method of claim 1, wherein identifying one or more portions of static information associated with the computing device includes determining at least one of computing device characteristics or computing device capabilities.

Example 3. The computer-implemented method of claim 1 or claim 2, wherein the computing device characteristics include at least one of: total system memory, device type identifier, software development kit (SDK) version, streaming buffer size, surface cache capacity, playback resolution, support for flexible streaming buffer, support for flexible graphics memory, user interface height, surface size, chipset manufacturer, or computing device brand name.

Example 4. The computer-implemented method of any of claims 1-3, wherein the dynamic information associated with the playback session includes at least one of: current computing device memory usage, navigational level, or foreground or background status.

Example 5. The computer-implemented method of any of claims 1-4, further comprising adjusting memory usage associated with the playback session of the media playback application.

Example 6. The computer-implemented method of any of claims 1-5, wherein adjusting memory usage associated with the playback session of the media playback application comprises emptying media data stored in a memory buffer associated with the playback session.

Example 7. The computer-implemented method of any of claims 1-6, wherein adjusting memory usage associated with the playback session of the media playback application is performed at different threshold amounts of time prior to the predicted out of memory kill.

Example 8. The computer-implemented method of any of claims 1-7, wherein the static information and the dynamic information are combined and implemented to train the ML model.

Example 9. The computer-implemented method of any of claims 1-8, wherein the graded window used to indicate a scaled likelihood that an out of memory kill will occur within a specified timeframe comprises a plurality of time threshold values that are temporally separated from the predicted specified timeframe.

Example 10. The computer-implemented method of any of claims 1-9, wherein the trained ML model is trained in a supervised manner using labelled input data.

Example 11. The computer-implemented method of any of claims 1-10, wherein the specified timeframe is specific to the media playback application.

Example 12. The computer-implemented method of any of claims 1-11, wherein the specified timeframe is specific to the computing device.

Example 13. A system comprising at least one physical processor; and physical memory comprising computer-executable instructions that, when executed by the physical processor, cause the physical processor to: identify one or more portions of static information associated with a computing device that is running a media playback application; monitor the media playback application during a playback session to identify one or more portions of dynamic information associated with the playback session; instantiate a trained machine learning (ML) model to determine, based on historical usage data associated with the media playback application, a likelihood that the media playback application will experience an out of memory kill, wherein the trained machine learning model implements a graded window to indicate a scaled likelihood that an out of memory kill will occur within a specified timeframe; and according to the trained ML model's determination, generate a prediction that an out of memory kill will occur for the media playback application within the specified timeframe.

Example 14. The system of claim 13, wherein the physical processor is further configured to train the ML model to predict out of memory kills within specified timeframes using the historical usage data.

Example 15. The system of claim 13 or claim 14, wherein dynamic information associated with the playback session prior to an out of memory kill is labeled in the historical data according to the graded window.

Example 16. The system of any of claims 13-15, wherein the dynamic information associated with the playback session that is closer in time to the out of memory kill is assigned a different value than dynamic information associated with the playback session that is further in time from the out of memory kill.

Example 17. The system of any of claims 13-16, wherein the physical processor is further configured to adjust memory usage associated with the playback session of the media playback application.

Example 18. The system of any of claims 13-17, wherein adjusting memory usage associated with the playback session of the media playback application comprises at least partially reducing media data stored in a memory buffer associated with the playback session.

Example 19. The system of any of claims 13-18, wherein adjusting memory usage associated with the playback session of the media playback application comprises emptying media data stored in a memory buffer associated with the playback session.

Example 20. A non-transitory computer-readable medium comprising one or more computer-executable instructions that, when executed by at least one processor of a computing device, cause the computing device to: identify one or more portions of static information associated with a computing device that is running a media playback application; monitor the media playback application during a playback session to identify one or more portions of dynamic information associated with the playback session; instantiate a trained machine learning (ML) model to determine, based on historical usage data associated with the media playback application, a likelihood that the media playback application will experience an out of memory kill, wherein the trained machine learning model implements a graded window to indicate a scaled likelihood that an out of memory kill will occur within a specified timeframe; and according to the trained ML model's determination, generate a prediction that an out of memory kill will occur for the media playback application within the specified timeframe.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
identifying static information associated with a computing device that is running a media playback application;
monitoring the media playback application during a playback session to identify dynamic information associated with the playback session;
instantiating a machine learning (ML) model trained with historical usage data associated with the media playback application, wherein the historical usage data is weighted according to temporal distance from out of memory kill events such that data corresponding to time intervals closer to a previous out of memory kill event is assigned greater importance than other data corresponding to other time intervals further from the previous out of memory kill event;
determining, by the ML model, a likelihood that the media playback application will experience an out of memory kill within a specified timeframe during the playback session based at least in part on the identified static and dynamic information; and
according to the trained ML model's determination, generating a prediction that an out of memory kill will occur for the media playback application within the specified timeframe.

2. The computer-implemented method of claim 1, wherein identifying the static information associated with the computing device includes determining at least one of computing device characteristics or computing device capabilities.

3. The computer-implemented method of claim 2, wherein the computing device characteristics include at least one of: total system memory, device type identifier, software development kit (SDK) version, streaming buffer size, surface cache capacity, playback resolution, support for flexible streaming buffer, support for flexible graphics memory, user interface height, surface size, chipset manufacturer, or computing device brand name.

4. The computer-implemented method of claim 2, wherein the dynamic information associated with the playback session includes at least one of: current computing device memory usage, navigational level, or foreground or background status.

5. The computer-implemented method of claim 1, further comprising adjusting memory usage associated with the playback session of the media playback application.

6. The computer-implemented method of claim 5, wherein adjusting the memory usage associated with the playback session of the media playback application comprises emptying media data stored in a memory buffer associated with the playback session.

7. The computer-implemented method of claim 5, wherein adjusting the memory usage associated with the playback session of the media playback application is performed at different threshold amounts of time prior to the predicted out of memory kill.

8. The computer-implemented method of claim 1, further comprising training the ML model with the historical usage data.

9. The computer-implemented method of claim 1, wherein the historical usage data comprises a graded window that:
is used to scale the likelihood that an out of memory kill will occur within the specified timeframe; and
includes a plurality of time threshold values that are temporally separated from the specified timeframe.

10. The computer-implemented method of claim 1, wherein the trained ML model is trained in a supervised manner using labelled input data.

11. The computer-implemented method of claim 1, wherein the specified timeframe is specific to the media playback application.

12. The computer-implemented method of claim 1, wherein the specified timeframe is specific to the computing device.

13. A system comprising:
at least one physical processor; and
physical memory comprising computer-executable instructions that, when executed by the physical processor, cause the physical processor to:
identify static information associated with a computing device that is running a media playback application;
monitor the media playback application during a playback session to identify dynamic information associated with the playback session;
instantiate a trained machine learning (ML) model trained with historical usage data associated with the media playback application, wherein the historical usage data is weighted according to temporal distance from out of memory kill events such that data corresponding to time intervals closer to a previous out of memory kill event is assigned greater importance than other data corresponding to other time intervals further from the previous out of memory kill event;
determine, by the ML model, a likelihood that the media playback application will experience an out of memory kill within a specified timeframe during the playback session based at least in part on the identified static and dynamic information; and
according to the trained ML model's determination, generate a prediction that an out of memory kill will occur for the media playback application within the specified timeframe.

14. The system of claim 13, wherein the physical processor is further configured to train the ML model to predict out of memory kills within specified timeframes using the historical usage data.

15. The system of claim 14, wherein the dynamic information is labeled in the historical data according to a graded window.

16. The system of claim 13, wherein the physical processor is further configured to adjust memory usage associated with the playback session of the media playback application.

17. The system of claim 16, wherein the physical processor is further configured to at least partially reduce media data stored in a memory buffer associated with the playback session.

18. The system of claim 16, wherein adjusting memory usage associated with the playback session of the media playback application comprises emptying media data stored in a memory buffer associated with the playback session.

19. A non-transitory computer-readable medium comprising one or more computer-executable instructions that, when executed by at least one processor of a computing device, cause the computing device to:
- identify static information associated with the computing device that is running a media playback application;
- monitor the media playback application during a playback session to identify dynamic information associated with the playback session;
- instantiate a trained machine learning (ML) model trained with historical usage data associated with the media playback application, wherein the historical usage data is weighted according to temporal distance from out of memory kill events such that data corresponding to time intervals closer to a previous out of memory kill event is assigned greater importance than other data corresponding to other time intervals further from the previous out of memory kill event;
- determine, by the ML model, a likelihood that the media playback application will experience an out of memory kill within a specified timeframe during the playback session based at least in part on the identified static and dynamic information; and
- according to the trained ML model's determination, generate a prediction that an out of memory kill will occur for the media playback application within the specified timeframe.

* * * * *